United States Patent [19]

Inkster et al.

[11] Patent Number: 4,850,407
[45] Date of Patent: Jul. 25, 1989

[54] WOOD WORKING TOOL

[76] Inventors: Kevin R. Inkster, Forrest Rd.; David J. Lewis, Location 1423 Barrabup Rd., both of Nannup, Australia, 6275

[21] Appl. No.: 194,834

[22] Filed: May 17, 1988

[30] Foreign Application Priority Data

May 20, 1987 [AU] Australia .................... PI02041

[51] Int. Cl.[4] ............................. B27G 13/00
[52] U.S. Cl. ........................ 144/240; 83/835; 83/840; 144/134 D; 144/218
[58] Field of Search ........... 83/835, 840; 144/218, 144/223, 235, 240, 134 D, 136 C

[56] References Cited

U.S. PATENT DOCUMENTS 1,607,036 11/1926 Baar .................... 144/240
3,425,467 2/1969 Willis .................... 83/839

Primary Examiner—W. Donald Bray
Attorney, Agent, or Firm—Albert L. Jeffers; David L. Ahlersmeyer

[57] ABSTRACT

A cutter to be mounted on a spindle of a rotary tool for use in shaping timber. The cutter comprising a rigid member to be mounted co-axially on the tool spindle to rotate therewith and having a plurality of spaced cutting teeth about the periphery of the member, each tooth having a cutting edge extending in a direction transverse to the plane of rotation of the member, and a cutting edge extending in a direction generally radial to the axis of rotation of the member. A depth control projection in advance of each tooth to control the depth of cut of both the transverse and radial cutting edges.

13 Claims, 2 Drawing Sheets

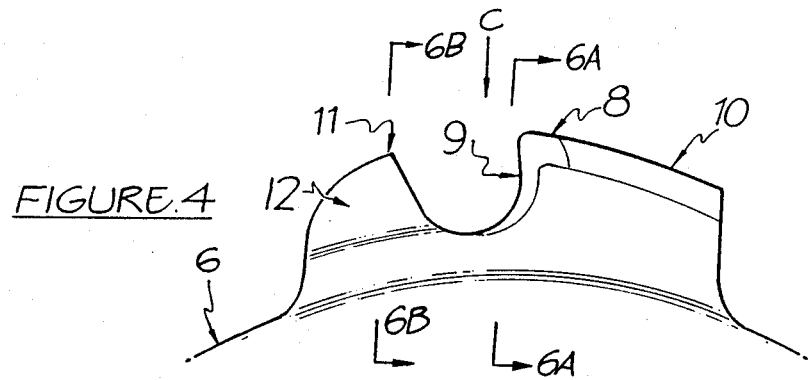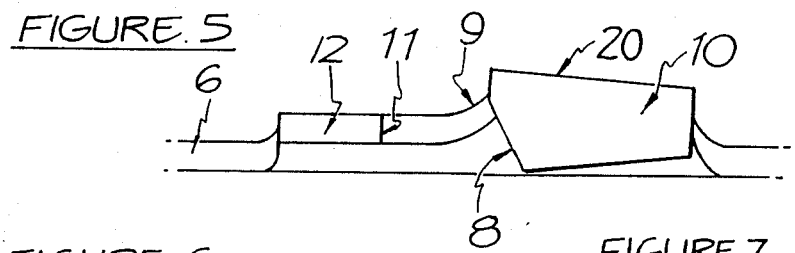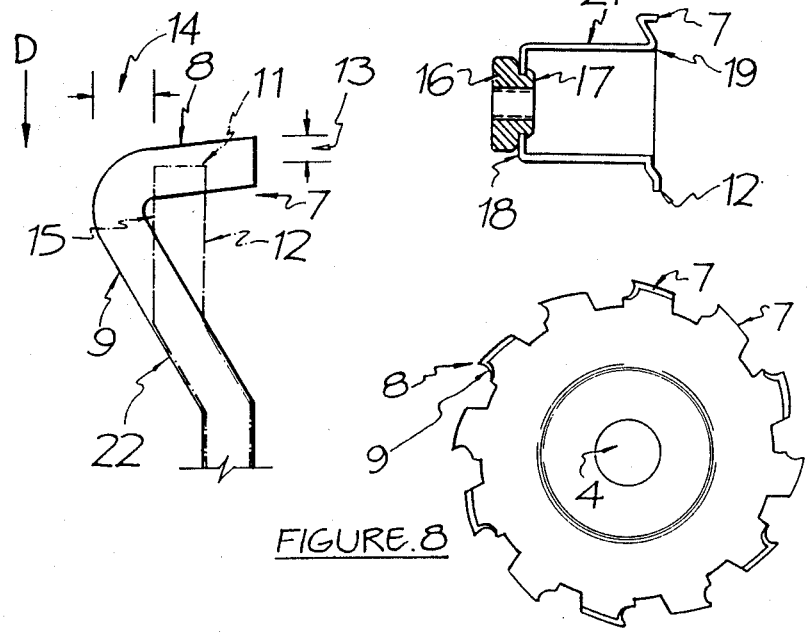

WOOD WORKING TOOL

This invention relates to a wood working tool for wasting and shaping wood.

In recent years wood sculpture and free form furniture have become popular. Conventionally a chain saw is used in the initial wasting the timber to form a general shape which is then refined with a chisel and like hand tool. In using a chain saw the nose portion is used and, because the nose portion is remote from the handles of the saw, control of the cutting is difficult. Lateral movement of the nose portion is not possible partly because of the presence of the bar supporting the cutting chain, and mainly because the cutting teeth of a chain saw do not have an appropriately positioned cutting edge with the necessary relief to cut when moved laterally. Thus, when a chain saw is used, considerable material is left to be removed by a chisel. The chisel work is relatively slow and laborious. Grinding discs may be used for finishing wasting operations, but these are also slow, and readily produce burning that discolours the timber.

It is an object of the present invention to provide a power tool cutter which can perform part of the wasting usually carried out by the chainsaw and the chisels, and is convenient and safe to use.

To this end the present invention provides a cutter to be mounted on a spindle of a rotary tool, said cutter comprising a rigid member adapted for mounting co-axially on the tool spindle to rotate therewith, a plurality of spaced cutting teeth about the periphery of the member, at least some of said cutting teeth having a cutting edge extending in a direction transverse to the plane of rotation of the member, and at least some of the teeth having a cutting edge extending in a direction generally radial to the axis of rotation of the member.

Preferably the transverse and radial cutting edges are provided on the same cutting teeth. Conveniently cutting depth control projections are provided to limit the depth of cut, at least of the transverse cutting edges, as excessive depth of cut may produce a "kick-back" action, similar to that experienced with a conventional chain saw. The depth control projection may be in the form of a generally radial projection from the peripheral edge of the rigid member in advance, with respect to the direction of rotation of the cutter, of each lateral cutting edge. The depth of the cut that the transverse cutting edge may make is the difference between the radial distance of the transverse cutting edge from the rotational axis and the radial distance of the tip of the depth control projection from that axis.

The same depth control projection may be positioned in a spaced relation to the radial cutting edge to control the depth of cut of the radial cutting edge, as the depth of cut control projection for the transverse cutting edge extends in the radial direction from the periphery of the rigid member, and so presents a radial face. The depth of cut of the radial cutting edge is controlled by the distance between the radial cutting edge and this radial face of the projection, measured in the direction parallel to the axis of rotation.

It is conventional in saws for the cutting teeth to be alternately offset in opposite direction from the saw blade upon which the teeth are mounted to provide clearance for the saw blade. This same offset arrangement is incorporated in the cutter according to the present invention, however in some forms of the cutter, all of the teeth may be offset to one side only of the plane of the cutter.

The arrangement of the cutting edges on the cutting teeth, as proposed by the present invention, enable the cutter to cut when moved into a piece of timber in the plane of rotation of the cutter and generally at right angles to the surface of the timber in the manner of a conventional saw. However the present cutter may also be moved in either direction normal to the plane of the cutter. Further the present cutter may be used with the plane of rotation of the cutter presented generally parallel or slightly inclined to the timber surface to be cut, and in this attitude may be moved in any direction across the timber surface, which is not possible with a conventional saw, including a chain saw. Also the present cutter may effect a combination of these movements to provide contoured surfaces which is also not possible with a chain saw or other saws.

Thus the operator may, using a power tool fitted with the cutter of the present invention, rapidly gouge large quantities of timber and so shape large areas in a relatively short time, and with little effort. In particular single and compound curved surfaces can be produced simply, and with a finish requiring a reduced amount of subsequent fine finishing and sanding.

Conventional disc type cutting power tools do not permit lateral movement and thus cannot function as gouging tools. The effectiveness of the cutter of this invention in lateral gouging is partly related to speed of rotation and to the spacing of the teeth, but is primarily derived from the form of the cutting teeth.

A preferred embodiment of this invention will now be described with reference to the drawings, in which:

FIG. 4 is an enlarged elevational view of the cutter tooth 'B' indicated in FIG. 3;

FIG. 5 is an enlaged view of a tooth of the cutter in the direction 'C' indicated in FIG. 4;

FIG. 6 shows section views along the lines 6A and 6B in FIG. 4, superimposed to illustrate the depth of cut of the transverse and radial cutting edges;

FIG. 7 is an axial section view of an alternative form of the cutter;

FIG. 8 is an elevational view of a further alternative form of the cutter.

Figure 2:
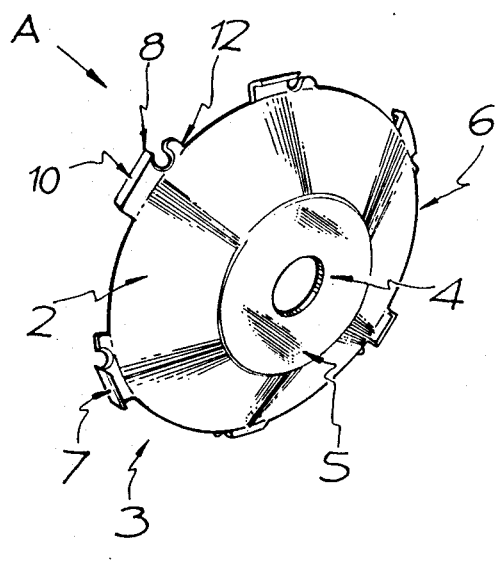
FIG. 2 is a perspective view of the cutter removed from the power tool.
Figure 3:
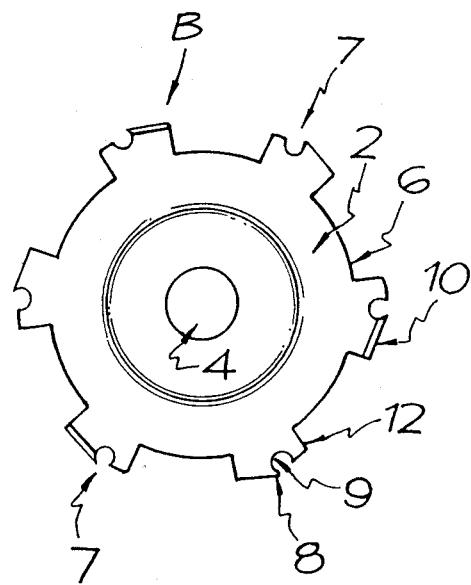
FIG. 3 is an elevated view of the cutter shown in FIG. 2 viewed in the direction 'A' indicated in FIG. 2.

Referring now to FIGS. 2 to 4, the cutter disc 3 is of a dished form having a central planar portion 5 and an integral flaired portion 2.

The central portion 5 has a co-axial attachment hole 4, which receives the spindle of a suitable power tool, or a bolt or the like that attaches the cutter to the power tool spindle. The axial depth from the central portion 5 to the outer perimetal edge 6 of the flaired portion 2, enable a nut or bolt head, that secures the disc to the spindle of the power tool, to be below the perimetal edge 6.

Equally spaced around the perimetal edge 6 are the six cutting teeth 7 each having a lateral cutting edge 8, transverse to the plane of the perimetal edge 6, and a generally radial cutting edge 9. The radial cutting edge is of an arcuate shape but effects a cut generally in the radial direction with respect to the plane of the rotation of the perimetal edge 6 of the cutter. The alternate teeth are offset in opposite directions from the plane of the perimetal edge 6, as is conventional in saws, so the radial cutting edges 9 are resultantly slightly inclined to that plane.

The cutting teeth 7 are generally of a construction similar to the cutting teeth of a chain saw, having a peripheral land 10 extending rearwardly from the transverse cutting edge 8 and inclined inwardly so as to be within the circle described by transverse cutting edge 8 as the cutter rotates to provide relief or clearance. These features of the cutting teeth are more clearly seen in FIG. 4. Further, as seen in FIG. 5, the radial land 20 is inclined inwardly from the radial cutting edge 9 toward the plane of the cutter to also provide relief or clearance in the direction of rotation. Clearance in this form is not provided on a conventional chain saw tooth, but is required on the teeth of the present cutter to render the radial cutting edge fully effective. The inclination of the land 20 as seen in FIG. 5, extends inwardly over the full extent of the inclined portion 22 of the tooth on which the radial cutting edge 9 is formed. This enables the radial cutting edge of the cutter to effectively cut when being operated to move in the direction D as shown in FIG. 6.

Depth control projections 12 are provided forward of each transverse cutting edge 8 as also shown in FIG. 4. The tip 11 of the projection 12 is on a radius less than that of the transverse cutting edge 8, the difference in radius determining the depth of the cut made by each transverse cutting edge as indicated at 13 in FIG. 6. The portion 15 of the depth control projection 12 is displaced from the radial cutting edge 9 in the axial direction, that displacement sets the depth of cut of the radial cutting edge as indicated at 14 in FIG. 6.

Figure 1:
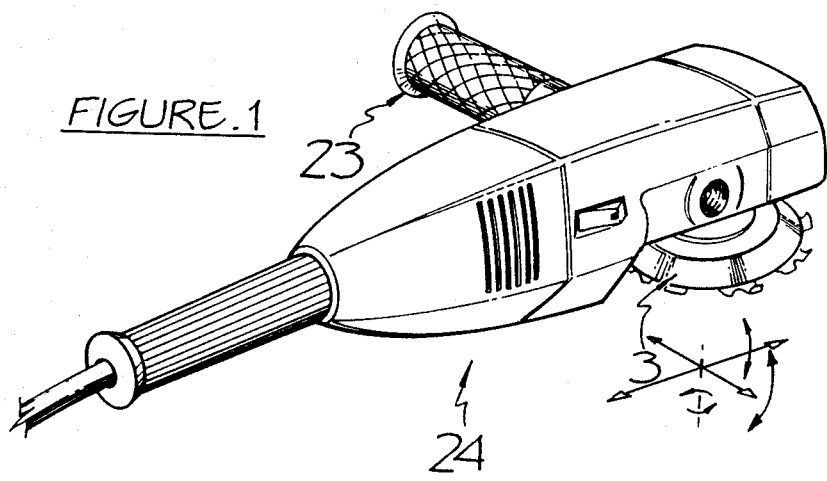
FIG. 1 is a perspective view of a typical power tool with a preferred form of the cutter attached thereto.

When the cutter 3 is mounted on the spindle of a rotary tool, such as an angle grinder 24 as shown in FIG. 1, it is possible to easily gouge and waste a piece of timber in directions in the plane of rotation of the cutter, when that plane is either normal or parallel to the surface to be worked, and moved in any direction across that surface. Typical directions of movement of the cutter are indicated by arrows in FIG. 1. The finish achieved is superior to that of a chisel and is achieved in a much shorter time.

Because the disc, carrying the cutting teeth, is centrally mounted on the power tool spindle, it is possible to provide on the tool a grip close to the cutting teeth, as indicated at 23 in FIG. 1, so that a high degree of manual control can be exerted over the cutting depth and movement.

When the disc is of the dished form as described with reference to FIGS. 2 and 3 of the drawings, there are some limitations in regard to the shapes which may be formed by the use of the cutter. It is therefore also proposed that the cutter may be in a form with cutting teeth carried on a peripheral flange of a generally cylindrically shaped cutter body. Such a cutter is illustrated in FIG. 7 of the drawings. The cylindrical portion 21 is of considerably less diameter than the dished cutter 2 shown in FIGS. 2 and 3, and also the overall diameter of the peripherally arranged cutting teeth 7 is considerably less than that of the cutting teeth shown in FIGS. 2 and 3. In this construction the end 18 of the cylinder remote from the cutting teeth 7 maybe closed with a central opening to receive the spindle of a power tool, or, alternatively, as shown, the closed end 18 of the cylinder incorporates a nut 16 secured to the cylinder 21 by the swaged portion 17. The nut is internally threaded so that it may be connected in threaded engagement with a threaded section of the spindle of the power tool. If desired, a locking nut may also be provided to cooperate with the nut 16 in the conventional locking nut relationship.

The provision of a threaded nut, integral with the cutter, as above described, may also be incorporated in the dished cutter, such as that previously described with reference to FIGS. 2 and 3, or into any other form which the cutter may take.

In the construction shown in FIG. 7 the cutting teeth 7 are formed on a peripheral flange 19 disposed radially to the axis of the cylinder, however, the flange and the cutting teeth thereon may be inclined to the cylinder axis.

In a further modification to the previously described cutter, the depth control projection 12 provided in advance of each cutting tooth, as previously described with reference to FIGS. 2 and 5, may be omitted from the construction of the cutter and the depth of cut is then left to be controlled in accordance with the skill of the operator. Where a depth control projection is not provided in association with each cutting tooth, it is desirable to reduce the pitch of the teeth so that each tooth will act in the manner of a depth control for the immediately following tooth, when considered in the direction of rotation of the cutter. A typical form of such tooth is shown diagrammatically in FIG. 8 of the accompanying drawings.

Preferably the disc 2 and cutting teeth 7 are of an integral construction as shown, and formed by stamping from a metal sheet. Alternatively the teeth 7 can be detachably fitted to the rim of the disc so that teeth of varying shapes can be interchanged. It is also possible to simply weld suitably formed cutting teeth to the periphery of a disc.

In one detachable tooth form, the teeth are provided with one or more apertures to enable each tooth to be fitting onto a corresponding number of pins provided on a disc adjacent the periphery thereof. Conveniently, a further clamp disc is provided, having apertures to also receive said pins, where, by axially clamping the discs together, the teeth are gripped therebetween and held in assembly on the pins.

In this specification, specific reference has been made to the use of the cutter in working timber, but it is to be understood it may also be used on many other materials, including plastics, rubbers, soft stone and soft metals such as lead and zinc.

From the above it can be seen that this invention provides a unique wood working cutter, that may be used to produce intricate curved surfaces quickly and acurately. The cutter may be used to cut in any direction independent of the direction of the grain of the timber. The operator has a high degree of control over the cutter when used in conjunction with a hand held angle grinder tool, and so is safe and accurate in operation. The finish resulting from the use of the tool requires a minimum of further working prior to sanding to a final finish. The cutter produces chips rather than dust and is therefore more environmentally acceptable. The tool may also be used for producing straight cuts, grooves, notches or trenches, and is therefore useful in the construction industry.

The claims defining the invention are as follows.

We claim:

1. A cutter to be mounted on a spindle of a rotary hand tool, said cutter comprising:

a rigid member adapted for mounting co-axially on the tool spindle to rotate therewith; and a plurality of spaced cutting teeth integral with and arranged in a single row about the periphery of the member, each said cutting tooth having a transverse cutting edge extending in a direction transverse to the plane of rotation of the member, and a radial cutting edge extending in a direction generally radial to the axis of rotation of the member, each cutting tooth being relieved rearward of the respective cutting edge so that the cutter may effectively cut in the direction of the plane of rotation thereof and in the direction transverse to said plane of rotation.

2. The cutter of claim 1, and further comprising:

a rigid projection extending from the member in advance of each tooth, the radial extent of said projection being less than that of the transverse cutting edge immediately therebehind with respect to the direction of rotation of the member, whereby the difference between said respective radial extents controls the depth of cut of said transverse cutting edge.

3. The cutter of claim 2, wherein said projection has a portion spaced from the radial cutting edge in the direction of the axis of rotation of the member, whereby the extent of said spacing controls the depth of cut of said radial cutting edge.

4. The cutter of claim 2, wherein said projection has a portion spaced from the radial cutting edge in the direction of the axis of rotation of the member, whereby the extent of said spacing controls the depth of cut of said radial cutting edge, and a portion of the tooth that extends rearwardly with respect to the direction of rotation of the cutter from the radial cutting edge is inclined to the plane of rotation of the radial cutting edge to provide relief rearwardly of the cutting edge.

5. The cutter of claim 1, and further comprising:

a rigid projection extending from the member in advance of each tooth in a generally radial direction, said projection having a portion spaced from the radial cutting edge in the direction of the axis of rotation of the member, whereby the extent of said spacing controls the depth of cut of said radial cutting edge.

6. The cutter of claim 1, wherein the rigid member is dish shaped.

7. The cutter of claim 1, wherein the rigid member consists of a cylindrical portion closed at one end and having an external perimetal flange at the other end, said closed end being adapted for mounting on the spindle of the rotary tool, and the cutting teeth being spaced about the periphery of the external flange.

8. The cutter of claim 1, and further comprising:

a rigid projection extending from the member in a generally radial direction in advance of each tooth having a radial cutting edge, said projection having a portion spaced from the radial cutting edge in the direction of the axis of rotation of the member, whereby the extent of said spacing controls the depth of cut of said radial cutting edge, and a portion of the tooth that extends rearwardly with respect to the direction of rotation of the cutter from the radial cutting edge is inclined to the plane of rotation of the radial cutting edge to provide relief rearwardly of the cutting edge.

9. The cutter of claim 1, and further comprising:

a power tool having a rotatable spindle, said rigid member being mounted co-axially on said spindle to rotate therewith.

10. A cutter to be mounted on a spindle of a rotary hand tool, said cutter comprising:

a rigid member adapted for mounting co-axially on the tool spindle to rotate therewith;

a plurality of spaced cutting teeth integral with and arranged in a single row about the periphery of the member, each said cutting tooth having a transverse cutting edge extending in a direction transverse to the plane of rotation of the member, and a radial cutting edge extending in a direction generally radial to the axis of rotation of the member, each cutting tooth being relieved radially inward rearward of the transverse cutting edge, and axially inward rearward of the radial cutting edge; and a rigid projection integral with the member in advance of each tooth, the radial extent of said projection being less than that of the transverse cutting edge immediately therebehind with respect to the direction of rotation of the member, whereby the difference between said respective radial etents controls the depth of cut of said transverse cutting edge of the tooth, said projection also having a portion spaced from the radial cutting edge in the direction of the axis of rotation of the member, whereby the extent of said spacing controls the depth of cut of said radial cutting edge of the tooth.

11. The cutter of claim 10, wherein the rigid member is dish shaped.

12. The cutter of claim 10, wherein the rigid member consists of a cylindrical portion closed at one end and having an external perimetal flange at the other end, said closed end being adapted for mounting on the spindle of the rotary tool, and the cutting teeth being spaced about the periphery of the external flange.

13. The cutter of claims 10, and further comprising:

a power tool having a rotatable spindle, said rigid member being mounted co-axially on said spindle to rotate therewith.

* * * * *